US011169787B2

(12) United States Patent
Alex et al.

(10) Patent No.: US 11,169,787 B2
(45) Date of Patent: *Nov. 9, 2021

(54) SOFTWARE ACCELERATION PLATFORM FOR SUPPORTING DECOMPOSED, ON-DEMAND NETWORK SERVICES

(71) Applicant: Hyperblox Inc., Nashua, NH (US)

(72) Inventors: Arun C. Alex, Nashua, NH (US); Sudhir Kunnath, Nashua, NH (US)

(73) Assignee: Hyperblox Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/022,641

(22) Filed: Sep. 16, 2020

(65) Prior Publication Data

US 2021/0004214 A1 Jan. 7, 2021

Related U.S. Application Data

(63) Continuation of application No. 16/273,518, filed on Feb. 12, 2019, now Pat. No. 10,809,987.

(Continued)

(51) Int. Cl.
*G06F 8/41* (2018.01)
*G06F 8/71* (2018.01)
(Continued)

(52) U.S. Cl.
CPC .............. *G06F 8/457* (2013.01); *G06F 8/433* (2013.01); *G06F 8/71* (2013.01); *G06F 9/4843* (2013.01);
(Continued)

(58) Field of Classification Search
CPC ...................................................... G06F 8/457
(Continued)

(56) References Cited

U.S. PATENT DOCUMENTS 8,069,435 B1 * 11/2011 Lai .................. G06Q 30/06
717/106
9,274,843 B2 3/2016 Jagtap
(Continued)

OTHER PUBLICATIONS

International Search Report and Written Opinion from International Application No. PCT/US2019/045337, dated Oct. 15, 2019.
(Continued)

*Primary Examiner* — Francisco J Aponte
(74) *Attorney, Agent, or Firm* — McDonnell Boehnen Hulbert & Berghoff LLP

(57) ABSTRACT

An example embodiment may involve obtaining one or more blueprint files. The blueprint files may collectively define a system of processing nodes, a call flow involving a sequence of messages exchanged by the processing nodes, and message formats of the messages exchanged by the processing nodes. The example embodiment may also involve compiling the blueprint files into machine executable code. The machine executable code may be capable of: representing the processing nodes as decomposed, dynamically invoked units of logic, and transmitting the sequence of messages between the units of logic in accordance with the message formats. The units of logic may include a respective controller and one or more respective workers for each type of processing node.

20 Claims, 16 Drawing Sheets

Related U.S. Application Data

(60) Provisional application No. 62/718,428, filed on Aug. 14, 2018.

(51) Int. Cl.
    *H04L 29/08* (2006.01)
    *G06F 9/48* (2006.01)

(52) U.S. Cl.
    CPC ...... *H04L 67/10* (2013.01); *G06F 2209/5011* (2013.01); *G06F 2209/5018* (2013.01)

(58) Field of Classification Search
    USPC .......................................................... 717/149
    See application file for complete search history.

(56) References Cited

U.S. PATENT DOCUMENTS

| | | | |
|---|---|---|---|
| 9,350,793 | B2 | 5/2016 | Gilfix et al. |
| 9,560,081 | B1 | 1/2017 | Woolward |
| 9,667,746 | B2 | 5/2017 | Bauer et al. |
| 9,843,624 | B1 | 12/2017 | Taaghol et al. |
| 9,870,294 | B2 | 1/2018 | Seto |
| 9,882,829 | B2 | 1/2018 | Maes et al. |
| 9,979,602 | B1 | 5/2018 | Chinnakannan et al. |
| 9,990,228 | B1 | 6/2018 | Jayanthi et al. |
| 9,996,331 | B1 | 6/2018 | Chen |
| 10,031,783 | B2 | 7/2018 | Jalagam et al. |
| 10,178,045 | B2 * | 1/2019 | Kumar .................. H04L 47/829 |
| 10,185,601 | B2 * | 1/2019 | Syed ....................... G06F 9/541 |
| 10,191,778 | B1 | 1/2019 | Yang et al. |
| 10,205,640 | B2 | 2/2019 | Chan et al. |
| 10,250,452 | B2 | 4/2019 | Lucas et al. |
| 10,277,488 | B2 * | 4/2019 | Leff .................... H04L 43/0823 |
| 10,341,438 | B2 | 7/2019 | Jain et al. |
| 10,409,578 | B2 | 9/2019 | Kripalani et al. |
| 10,430,250 | B2 | 10/2019 | Ishikawa et al. |
| 10,474,451 | B2 | 11/2019 | Dake |
| 10,809,987 | B2 * | 10/2020 | Alex ......................... G06F 8/45 |
| 2006/0074736 | A1 | 4/2006 | Shukla et al. |
| 2010/0281166 | A1 | 11/2010 | Buyya et al. |
| 2011/0276951 | A1 | 11/2011 | Jain |
| 2012/0047239 | A1 | 2/2012 | Donahue et al. |
| 2012/0240135 | A1 | 9/2012 | Risbood et al. |
| 2013/0185715 | A1 * | 7/2013 | Dunning ............. G06F 9/45558 718/1 |
| 2013/0227091 | A1 * | 8/2013 | Tompkins ............. G06F 9/5072 709/220 |
| 2013/0232463 | A1 | 9/2013 | Nagaraja et al. |
| 2013/0232498 | A1 | 9/2013 | Mangtani et al. |
| 2013/0254755 | A1 | 9/2013 | Yousouf et al. |
| 2013/0304788 | A1 | 11/2013 | DeLuca et al. |
| 2014/0040883 | A1 | 2/2014 | Tompkins |
| 2014/0059226 | A1 | 2/2014 | Messerli et al. |
| 2015/0095917 | A1 | 4/2015 | Challenger et al. |
| 2015/0242237 | A1 | 8/2015 | Spivak et al. |
| 2015/0350101 | A1 | 12/2015 | Sinha et al. |
| 2016/0094483 | A1 | 3/2016 | Johnston et al. |
| 2016/0165110 | A1 | 6/2016 | Weng et al. |
| 2016/0352634 | A1 | 12/2016 | Itsumi |
| 2017/0012834 | A1 | 1/2017 | Chan et al. |
| 2017/0054595 | A1 | 2/2017 | Zhang |
| 2017/0139695 | A1 | 5/2017 | Govindaraju et al. |
| 2017/0244785 | A1 | 8/2017 | Broustis et al. |
| 2017/0364434 | A1 * | 12/2017 | Kairali ................ G06F 11/3668 |
| 2018/0088935 | A1 | 3/2018 | Church et al. |
| 2018/0095778 | A1 | 4/2018 | Aydelott et al. |
| 2018/0115485 | A1 | 4/2018 | Chiba |
| 2018/0136931 | A1 | 5/2018 | Hendrich et al. |
| 2018/0157508 | A1 | 6/2018 | Chen et al. |
| 2018/0165122 | A1 | 6/2018 | Dobrev |
| 2018/0173554 | A1 | 6/2018 | CaraDonna et al. |
| 2018/0189039 | A1 * | 7/2018 | Hart .......................... G06F 8/76 |
| 2018/0285166 | A1 | 10/2018 | Roy et al. |
| 2018/0287883 | A1 | 10/2018 | Joshi et al. |
| 2018/0287902 | A1 | 10/2018 | Chitalia et al. |
| 2018/0300499 | A1 | 10/2018 | Agarwal et al. |
| 2018/0309626 | A1 | 10/2018 | Andrianov et al. |
| 2018/0336207 | A1 | 11/2018 | Dunne et al. |
| 2018/0365008 | A1 | 12/2018 | Chandramouli et al. |
| 2018/0373765 | A1 * | 12/2018 | Kaliavaradhan .... G06F 16/2465 |
| 2019/0042286 | A1 | 2/2019 | Bailey et al. |
| 2019/0212992 | A1 | 7/2019 | Jonnadula et al. |
| 2019/0220331 | A1 | 7/2019 | Duggal et al. |
| 2019/0243687 | A1 | 8/2019 | Chen |
| 2019/0310872 | A1 | 10/2019 | Griffin et al. |
| 2019/0347127 | A1 | 11/2019 | Coady et al. |
| 2019/0370632 | A1 | 12/2019 | Mainali et al. |
| 2020/0028848 | A1 | 1/2020 | Gupta et al. |
| 2020/0034167 | A1 | 1/2020 | Parthasarathy et al. |

OTHER PUBLICATIONS

"What is Kubernetes?—Kubernetes, Concepts," https://kubernetes.io/docs/concepts/overview/what-is-kubernetes/, printed from the World Wide Web Feb. 11, 2019.

"Docker overview / Docker Documentation," https://docs.docker.com/engine/docker-overview/, printed from the World Wide Web Feb. 11, 2019.

Kubernetes: "Pod Overview"; https://kubernetes.io/docs/concepts/workloads/pods/pod-overview/, May 5, 2018.

Extended European Search Report dated Aug. 12, 2021, in corresponding European Application No. 19849086.4, 12 pages.

Galatopoullos et al., "Developing Parallel Applications Using the JavaPorts Environment", Advances in Intelligent Data Analysis XIX, 1999, vol. 1586, 813-828.

* cited by examiner

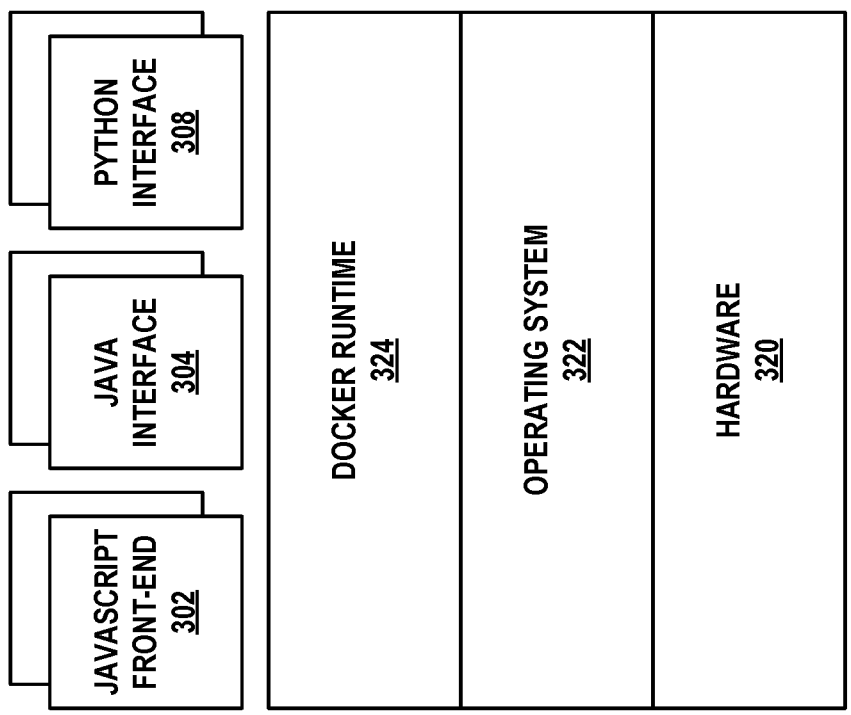
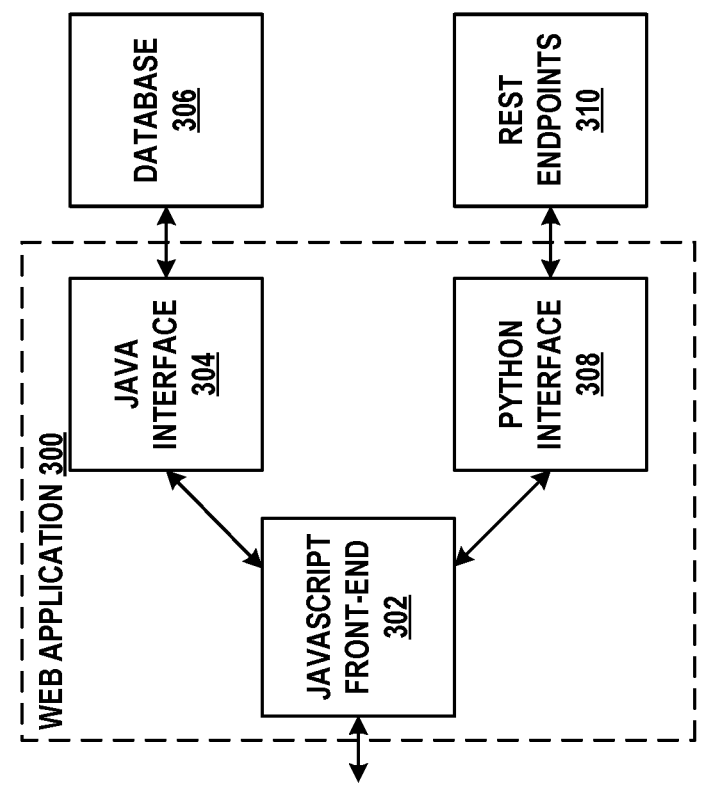
FIG. 3B
FIG. 3A

```
800 →  clusterlet(:controller,:type=>:controller){
       }

802 →  clusterlet(:CORE_controller,:type=>:controller,:parent=>:controller){
         section(:config,:desc=>"Configuration Data"){ }
         section(:context,:desc=>"Context Data"){ }
       }

804 →  clusterlet(:CORE,:collection=>true,:parent=>:CORE_controller){
         section(:config,:desc=>"Configuration Data"){ }
         section(:context,:desc=>"Context Data"){
           field(:serverName, :type=>"OCTETSTRING", :desc=>"Server Identifier")
         }
       }

806 →  clusterlet(:RADIO_controller,:type=>:controller,:parent=>:controller){
         section(:config,:desc=>"Configuration Data"){ }
         section(:context,:desc=>"Context Data"){ }
       }

808 →  clusterlet(:RADIO,:collection=>true,:parent=>:RADIO_controller){
         section(:config,:desc=>"Configuration Data"){ }
         section(:context,:desc=>"Context Data"){ }
       }

810 →  clusterlet(:SERVER_controller,:type=>:controller,:parent=>:controller){
         section(:config,:desc=>"Configuration Data"){ }
         section(:context,:desc=>"Context Data"){ }
       }

812 →  clusterlet(:SERVER,:collection=>true,:parent=>:SERVER_controller){
         section(:config,:desc=>"Configuration Data"){
           field(:myname, :type=>"OCTETSTRING", :desc=>"Server Identifier")
         }
         section(:context,:desc=>"Context Data"){
           field(:count, :type=>"UINT32")
           field(:successFlag, :type=>"BOOL")
           field(:failureFlag, :type=>"BOOL")
         }
       }
```

FIG. 8A

```
820 ──▶ callflow(:Registration_Procedure, :type=>:Registration_Procedure) {}

822 ──▶ callflowdef(:Registration_Procedure, :spec=>"SAMPLE-001", :version=>"v1.0",
       :section=>"7.1", :desc=>"This procedure is used to perform registration with the
       SERVER via CORE"){
         sendmsg(:trigger_start, :type=>"RegisterRequest",:extsrc=>:test, :dst=>:RADIO)
         sendmsg(:RADIO_Register_Request, :type=>"RegisterRequest", :src=>:RADIO,
       :dst=>:CORE, :onrecv=>true)
         sendmsg(:CORE_Register_Request, :type=>"RegisterRequest", :src=>:CORE,
       :dst=>:SERVER, :instance=>"instance/serverName", :onrecv=>true)
         callflow(:SERVER_Registration_Procedure, :type=>:SERVER_Registration_Procedure)
         sendmsg(:RADIO_Register_Response, :type=>"RegisterResponse", :src=>:CORE,
       :dst=>:RADIO)
         sendmsg(:trigger_done, :src=>:RADIO, :extdst=>:test)
       }

824 ──▶ callflowdef(:SERVER_Registration_Procedure, :spec=>"SAMPLE-001", :version=>"v1.0",
       :section=>"7.1.1", :desc=>"This procedure is used to authenticate registration request
       from user"){
         callflow(:Response, :oneof=>:below) {
           sendmsg(:CORE_Register_Response_Success, :type=>"RegisterResponse",
       :src=>:SERVER, :dst=>:CORE, :condition=>"successFlag") {
824A  ⎰      field(:status) {
              field(:statusCode, :from=>"value/0")
            }
           }
           sendmsg(:CORE_Register_Response_Fail, :type=>"RegisterResponse", :src=>:SERVER,
       :dst=>:CORE, :condition=>"failureFlag") {
824B  ⎰      field(:status) {
              field(:statusCode, :from=>"value/100")
              field(:statusDescription, :from=>"value/Authentication Error")
            }
           }
         }
       }
```

FIG. 8C

830 → message(:RegisterRequest, :spec=>"SAMPLE-001", :version=>"v1.0", :section=>"1.1"){
  field(:keyValue, :type=>"OCTETSTRING")
  field(:serverName, :type=>"OCTETSTRING")
}

832 → message(:RegisterResponse, :spec=>"SAMPLE-001", :version=>"v1.0",
:section=>"1.2.1"){
  field(:keyValue, :type=>"OCTETSTRING")
  field(:status, :type=>"StatusObject")
}

834 → message(:StatusObject, :spec=>"SAMPLE-001", :version=>"v1.0", :section=>"1.2.2"){
  field(:statusCode, :type=>"UINT32", :constraint=>[0, 100..105, 200])
  field(:statusDescription, :optional=>true, :type=>"OCTETSTRING")
}

FIG. 8D

```
840 → function onrecv_RADIO_Register_Request(instance,transaction,message)
        instance.context.serverName = message.serverName
      end 842 → function onrecv_CORE_Register_Request(instance,transaction,message)
        if instance.context.count < 2 then
          instance.context.successFlag = true
          instance.context.failureFlag = false
          instance.context.count = instance.context.count+1
        else
          instance.context.failureFlag = true
          instance.context.successFlag = false
          instance.context.count = 0
        end
      end
```

SOFTWARE ACCELERATION PLATFORM FOR SUPPORTING DECOMPOSED, ON-DEMAND NETWORK SERVICES

CROSS-REFERENCE TO RELATED APPLICATIONS

This application is a continuation of and claims priority to U.S. patent application Ser. No. 16/273,518, filed Feb. 12, 2019, which is hereby incorporated by reference in its entirety.

U.S. patent application Ser. No. 16/273,518 claims priority to U.S. provisional patent application No. 62/718,428, filed Aug. 14, 2018, which is hereby incorporated by reference in its entirety.

BACKGROUND

Traditionally, software applications are configured to be executed by a particular computing device and depend on a computing environment (e.g., operating system and libraries) provided thereby. This means that any given software application is likely to be specific to a particular computing environment. Such a situation can be limiting, as the software application may need to be deployed across different types of computing environments.

Containerized software packages address at least some of these concerns. A container is a stand-alone executable package of a software application that includes components needed to run the software application, such as the software application's executable code, runtime, system tools, system libraries, and/or settings, among other components. The container allows the software application to execute consistently in computing environments that support the container technology, often regardless of operating system kernel version or distribution.

Execution of containerized software applications is often facilitated by a container orchestration system that groups containers into units, and manages the deployment and execution of these units across one or more physical or virtual computing devices. In this way, a software application may be scaled up to meet increasing demand by increasing the number of units in which copies of the software application are being executed, or it may be scaled down by terminating some of the units.

Nonetheless, even these technologies do not fully address the needs of dynamic, demand-driven, server-based or serverless computing environments. In particular, while they facilitate deployment and scaling, they do not specifically address easing the development of new software system architectures and applications in such environments or executing these applications in a lightweight and efficient fashion.

SUMMARY

The embodiments herein introduce a new, system-level paradigm of network application deployment. By way of a blueprint, users can define nodes (also referred to as "processing nodes") within such a system, as well as call flows (sequences of messages) between these nodes and the content of the messages. To do so, the user creates a high-level system model specification that can be compiled into executable code. The executable code is capable of carrying out the specified functions and operations of these nodes. Through use of visual tools, the user can test this dynamically created system model for correctness prior to deployment.

The processing nodes may be virtualized software representations of physical devices, software applications, and/or modules of software applications. Thus, as described herein, a processing node may perform, in software, any network function or part thereof typically attributable to a device or application. In examples, processing nodes may represent client devices or client applications, server devices or server applications, or one or more such devices or applications. Further, processing nodes may represent decomposed arrangements of discrete parts of a device or an application. For instance, a server application with three software components may be represented with one or more distinct processing nodes.

The blueprint provides support for decomposing functions of each node and/or its constituent applications into application state and a number of discrete executable units each defined to carry out a specific task on demand. The application state maintains temporary and/or persistent data used by the application. The executable units may be referred to as "clusterlets," and are divided into various types, each with well-defined functions.

For example, a worker clusterlet is initiated on demand to handle the requirements of a specific task. Such a clusterlet may be invoked to process various events, for instance receiving a message and then writing pertinent information therefrom to the application state. A decomposed system or application may consist of any number of clusterlets.

Advantageously, a clusterlet is created, executed, and destroyed on demand, with any data that needs to be available to future clusterlets being stored in the application state. Thus, clusterlets allow an extremely scalable and lightweight model of system and application deployment, because they do not use processor resources unless they are executing. Particularly, clusterlets may be comprised of program instructions and data that consume relatively little memory.

In examples, clusterlets carry out their tasks as threads of execution that are controlled by a clusterlet runtime. The clusterlet runtime, in turn, executes by way of one or more operating system processes within a container. The container may be part of an orchestrated pod of containers. Thus, the embodiments herein can build upon existing container and orchestration solutions.

In this fashion, new systems and applications can be defined with little or no programming on the part of the designer. For instance, when a new network system architecture for a particular service becomes available (e.g., by way of a public standard), a designer need only define the associated blueprint, and then compile the blueprint into machine executable code that can operate in conjunction with the clusterlet runtime. Thus, the designer avoids the laborious and error-prone tasks of coding and testing every single operation, interface, and message of the new system or application.

A first example embodiment may involve obtaining one or more blueprint files. The blueprint files may collectively define a system of processing nodes, a call flow involving a sequence of messages exchanged by the processing nodes, and message formats of the messages exchanged by the processing nodes. The first example embodiment may also involve compiling the blueprint files into machine executable code. The machine executable code may be capable of: representing the processing nodes as decomposed, dynamically invoked units of logic (e.g., clusterlets), and transmitting the sequence of messages between the units of logic in accordance with the message formats. The units of logic may include a respective controller and one or more respective workers for each type of processing node.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 3A and 3B illustrate a containerized application, in accordance with example embodiments.

FIG. 8A depicts part of a blueprint, in accordance with example embodiments.

FIG. 8C depicts another part of a blueprint, in accordance with example embodiments.

FIG. 8D depicts yet another part of a blueprint, in accordance with example embodiments.

FIG. 8E depicts still another part of a blueprint, in accordance with example embodiments.

FIG. 9C depicts yet another GUI, in accordance with example embodiments.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Introduction

Rapid development and deployment of complex software applications and systems is critical to today's communication and computing infrastructure, especially in telecommunication, networking, and data center environments. But traditional software development and deployment techniques and technologies are limited and fail to fulfill today's dynamic needs. The following subsections discuss several technologies that are incorporated into the embodiments herein.

A. Example Computing Devices

Figure 1:
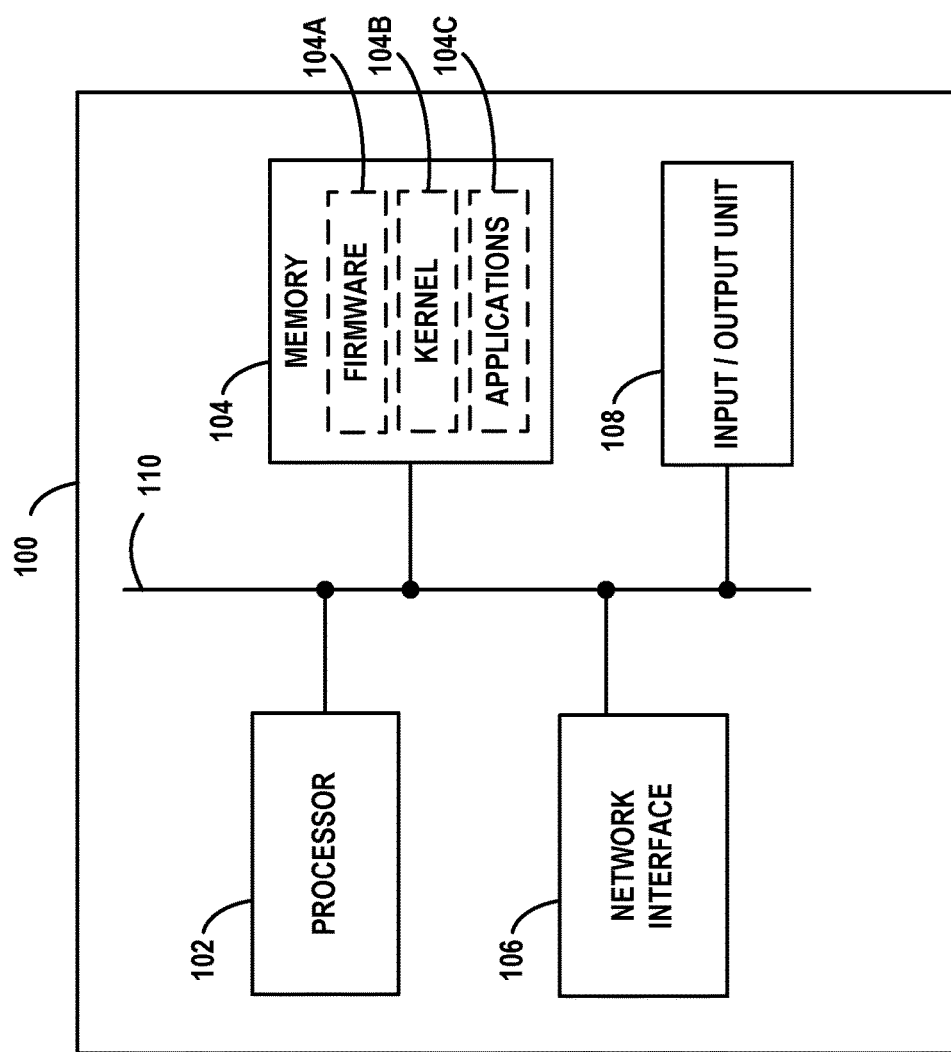
FIG. 1 illustrates a schematic drawing of a computing device, in accordance with example embodiments.

FIG. 1 is a simplified block diagram exemplifying a computing device 100. This computing device illustrates some of the components that could be arranged to cause the computing device to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents main memory units as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless (e.g., cellular) interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, computing device 100 may represent a virtual machine, and any computing device 100 may support multiple virtual machines. In general, a virtual machine is an emulation of a computing system, and mimics the functionality (e.g., processor, memory, and communication resources) of a physical computer. One physical computing system may support up to hundreds or thousands of individual virtual machines. In some embodiments, virtual machines may be managed by a centralized server device or application that facilitates allocation of physical hardware resources to individual virtual machines, as well as performance and error reporting. Virtual machines are often employed in order to allocate hardware resources in an efficient, as needed fashion. Providers of virtualized computing systems include VMWARE® and MICROSOFT®, as well as various other vendors.

Notably, applications 104C may be developed and designed to operate using a specific operating system (enabled by kernel 104B) and specific libraries. Further, applications 104C may also be dependent, in some way, on the physical hardware (or virtual machine architecture) of computing device 100. Thus, applications 104C may be developed specifically for this combination of operating system and hardware, and providing applications 104C on other types of computing devices and/or operating systems may require a time consuming process to port (refactor) and test applications 104C.

Additionally, scaling a service requires replicating some number of instances of computing device 100. This leads to difficulties coordinating and orchestrating applications and devices for dynamic load requirements, redundancy, high-availability, and load balancing.

B. Cloud-Based Server Clusters

In some embodiments, one or more instances of computing device 100 may be deployed to support potential large-scale deployment of one or more applications or services (e.g., web based services, media streaming services, and/or telecommunications services). The exact physical location, connectivity, and configuration of these computing devices may be unknown and/or unimportant to client devices. Accordingly, the computing devices may be referred to as "cloud-based" devices that may be housed at various remote data center locations.

Figure 2:
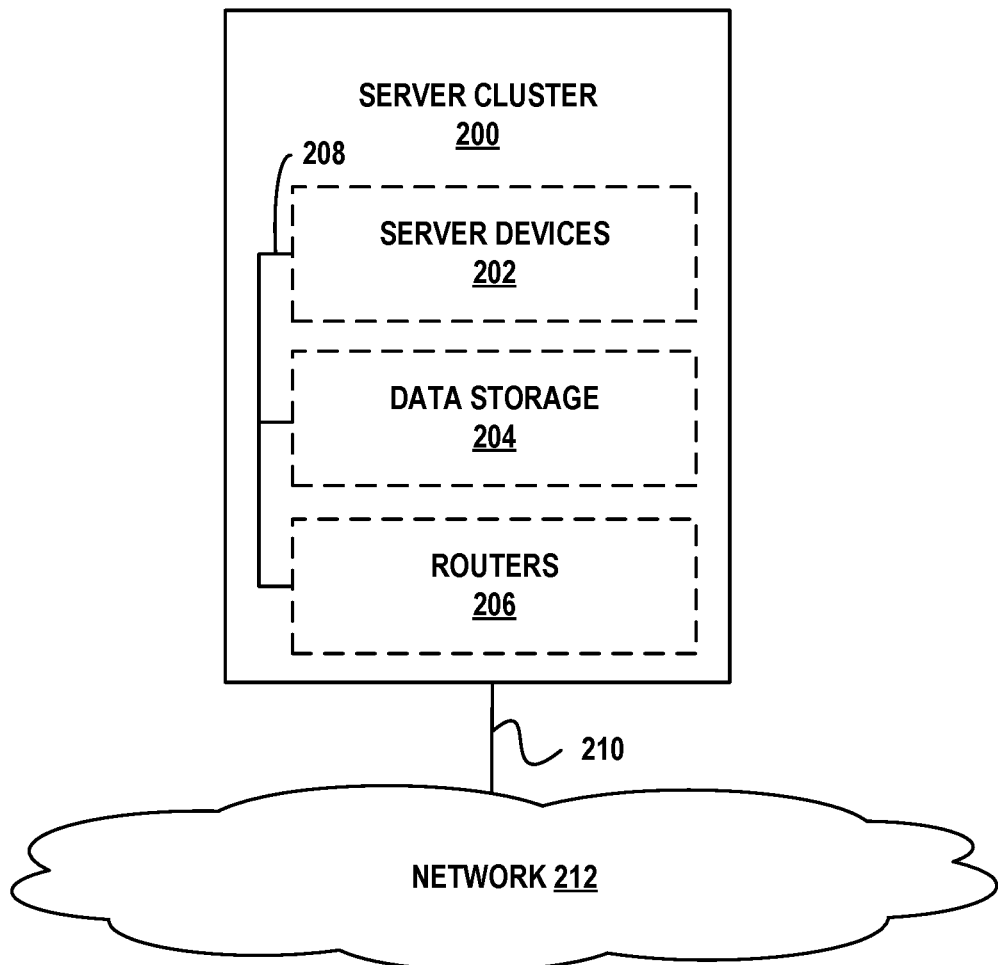
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100 with or without virtual machine support) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may be used to arrange the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

One advantage of the architecture of server cluster 200 is that processing (server devices 200) can be scaled independently from long-term memory (data storage 204). Thus, server cluster 200 can more easily be adapted to varying loads than, for example, a number of instances of computing device 100 each operating independently. Further, as noted above, redundancy, high-availability, and load balancing may be handled by server cluster 200 across server devices 202 and data storage 204.

Nonetheless, server cluster 200 may suffer from some of the same limitations as computing device 100—that is, applications are developed for a specific operating system or operating system/hardware combination. Also, these applications may be required to support cluster-specific redundancy, high availability, and load balancing mechanisms. Further, scaling applications beyond one instance of server cluster 200 may require another layer of redundancy, high availability, and load balancing to be deployed between multiple instances of such clusters.

C. Operating System and Hardware Independent Containerized Applications

A containerized software application may be configured to be executed in a container. A container, in turn, is a software package that includes an entire runtime environment needed to execute the containerized software application on a particular operating system. The container may thus include therein the code (e.g., a binary code image) that defines the software application, libraries utilized by the software application, and configuration files utilized by the software application, among other elements needed for execution of the software application. An example containerization platform is DOCKER®, but other containerization platforms and architectures may be used.

As a result, the containerized software application can be executed on a wide variety of underlying hardware platforms independently of their individual capacities or physical locations. Furthermore, multiple operating systems can be supported by containerizing an application for each such operating system. Thus, application containerization may, in some cases, be referred to as operating system virtualization. Application containerization may also allow for the existence of multiple distinct and isolated user-spaces on a single machine (e.g., physical machine or virtual machine). Therefore, an application executing within a container may be able to access only its own container's resources, but not the resources of other containers.

FIG. 3A illustrates containerization of an example application 300. Application 300 is web-based and includes JavaScript front-end 302, Java interface 304 to database 306, and Python interface 308 to one or more representational state transfer (REST) endpoints 310. Application 300 is relatively simple for purposes of illustration, and more complex applications, web-based or otherwise, may be containerized. One of the challenges with deploying application 300 is determining how many of each of JavaScript front-end 302, Java interface 304, and Python interface 308 should be operational at any time, as well as managing multiple copies of these modules.

FIG. 3B depicts containerization of application 300. Starting from the bottom of FIG. 3B, there is hardware 320 (e.g., computing device 100 or server cluster 200) on which operating system 322 executes. DOCKER® runtime 324 executes on operating system 322 and provides support for the execution of containerized applications. For example, DOCKER® runtime 324 may be a service that is capable of retrieving, starting, stopping, and deleting containerized applications. On top of DOCKER® runtime 324 are three containers, one for each of JavaScript front-end 302, Java interface 304, and Python interface 308. The combination of these containers serves to operate application 300. Further, each of these containers can be scaled up to execute multiple copies of whatever they contain.

An advantage of containerization is that applications can be rapidly deployed across various configurations of physical and/or virtual machines. Thus, containers can execute on any available computing resources as long as those computing resources support DOCKER® runtime 324 (herein a "computing resource" is defined as any computing hardware or virtual machines on which a containerized application can be deployed). Containerization also allows each container to be scaled independently of one another.

But when the capacity of hardware 320 is taxed, containerized applications still suffer from the same scaling issues as computing device 100 or server cluster 200. In particular, it may be tempting to replicate the stack of FIG. 3B one or more times to add more capacity to application 300. But this would result in having to re-address load balancing between the stacks, and also would potentially require that each stack be manually reconfigured whenever a new container is added to or removed from application 300.

D. Orchestration for Containerized Applications

Figure 4:
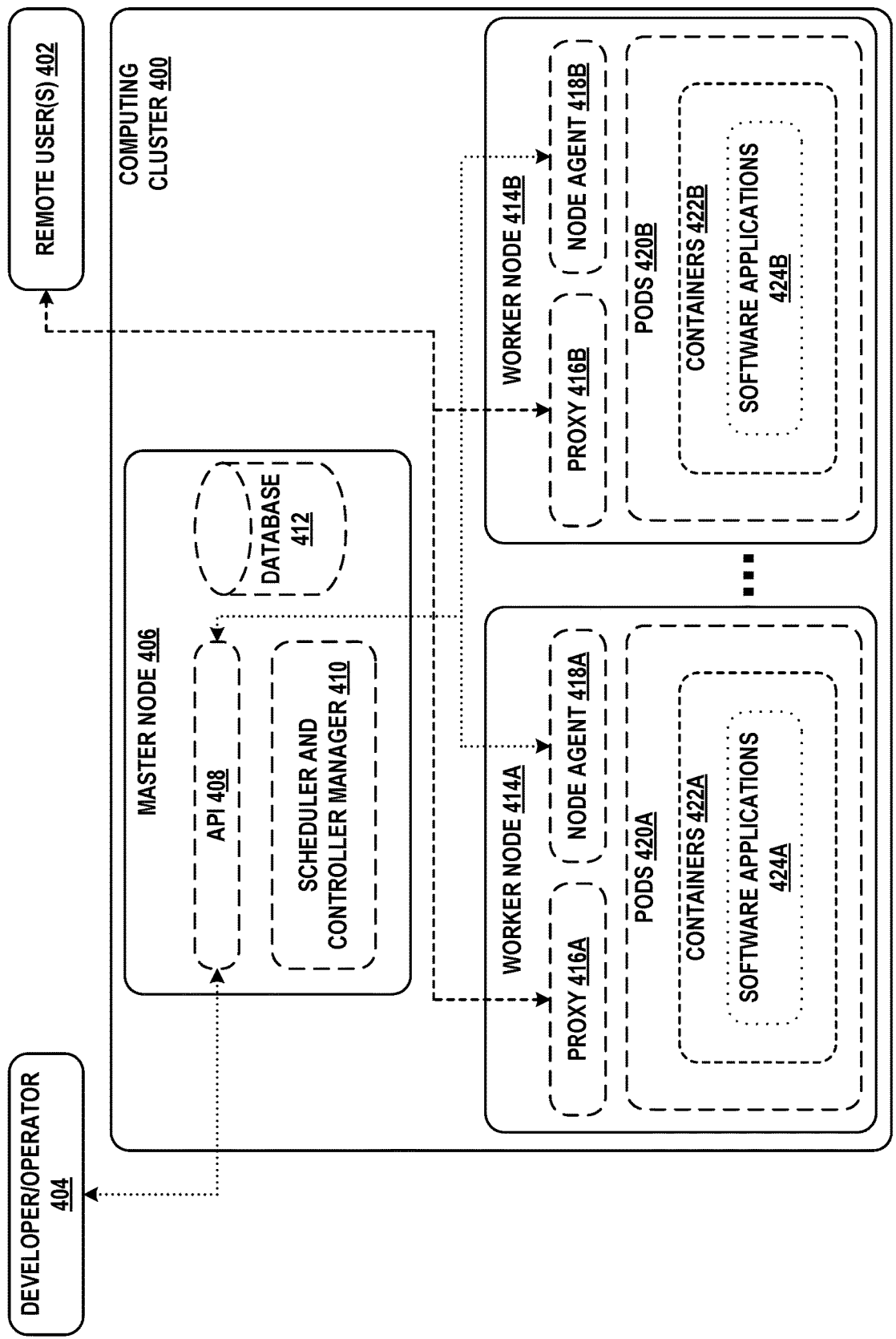
FIG. 4 illustrates an orchestration system for containerized applications, in accordance with example embodiments.

FIG. 4 illustrates an example platform for orchestrating containerized software applications. Computing cluster 400 may include master node 406 and a plurality of worker nodes, including worker nodes 414A and 414B. Worker nodes 414A and 414B may be any type and any number of physical or virtual computing resources.

Worker nodes 414A and 414B may host software applications 424A and 424B, respectively, and software applications 424A and 424B may be executable within corresponding containers 422A and 422B, respectively. Containers 422A and 422B may be organized into pods 420A and 420B, respectively. Thus, each pod may house one or more containers, and each container may house one or more software applications.

In some embodiments, a pod is the smallest unit of deployment in computing cluster 400. Thus, containers in a pod may share storage space, an Internet Protocol (IP) address (i.e., each pod may be assigned a distinct IP address), Transmission Control Protocol (TCP) and/or User Datagram Protocol (UDP) port space, and operating system namespaces, among other shared resources. Pods 420A and 420B may be, for example, KUBERNETES® pods, DOCKER SWARM® tasks, MESOS® pods, or KONTENA® stacks, among other possibilities. Pods 420A and 420B may thus be building blocks of a container orchestration engine that facilitates management and execution of software applications in containers. The specific implementations of pods 420A and 420B may vary depending on the specific implementation of the container orchestration engine. Containers 422A and 422B may be, for example, DOCKER® containers or COREOS® rkt containers, among other possibilities.

Master node 406 may include a specification of deployment parameters for each pod. These parameters may specify one or more container images, the TCP and/or UDP ports used by these container images, an extent of replication for the pod. The specification may take the form of an XML file, JavaScript Object Notation (JSON) file, a YAML Ain't Markup Language (YAML) file, or some other type of file. This deployment configuration may be stored in database 412 along with other information that maintains the operational state of computing cluster 400. Thus, master node 406 may be configured to manage the number, distribution, and scheduling of pods amongst the available worker nodes (e.g., worker nodes 414A and 414B).

Developer/operator 404 (e.g., the developer or operator of software applications 424A and 424B) may be able to communicate with master node 406 by way of application programming interface (API) 408. API 408 may allow developer/operator 404 to upload the specification of deployment parameters to master node 406, and to roll out updates to software applications 424A and/or 424B, among other tasks. API 408 may also allow developer/operator 404 to manage other aspects of computing cluster 400, such as various options and settings affecting execution of software applications 424A and 424B.

API 408 may also be configured to communicate with node agents 418A and 418B (e.g., "Kubelets" in KUBERNETES® terminology) on worker nodes 414A and 414B to monitor and control execution of pods 420A and 420B, containers 422A and 422B, and/or software applications 424A and 424B, respectively. API 408 may, for example, be configured to communicate with node agents 418A and 418B to initiate execution of containerized software applications 424A and 424B in pods 420A and 420B, respectively, monitor pods 420A and 420B to detect any execution errors, and replace one or more of pods 420A and 420B in response to termination of the one or more of pods 420A and 420B, among other operations.

Scheduler and controller manager 410 may be configured to determine the scheduling and distribution of software applications 424A and 424B, containers 422A and 422B, and pods 420A and 420B among the plurality of worker nodes in computing cluster 404.

Worker nodes 414A and 414B may include proxies 416A and 416B (e.g., "Kube-proxies" in KUBERNETES® terminology), respectively, via which remote user(s) 402 may be able to access software applications 424A and 424B, respectively. Proxies 416A and 416B may be configured to proxy UDP and TCP traffic and provide load balancing to worker nodes 414A and 414B, respectively, among other operations. In some implementations, a group of pods may be organized into a service that is associated with one or more policies that control access the group of pods. Each service may be assigned a stable virtual IP address that is exposed outside of computing cluster 400. Proxies 416A and 416B may be configured to access the service into which the group of pods is organized, rather than accessing the pods directly. Thus, software applications 424A and 424B may be accessible regardless of changes in the number of pods, changes in the IP addresses of pods, or changes in the distribution of pods among worker nodes 414A and 414B.

The architecture illustrated in FIG. 4 may provide a self-healing mechanism that automatically addresses failure or termination of worker nodes, pods, containers, and/or software applications and facilitates ongoing maintenance thereof. Whenever a copy or instance of a software application becomes unavailable due to an unexpected failure or planned termination of the software application, container, pod, or worker node, (or for any other reason) scheduler and controller manager 410 may automatically replace the unavailable copy of the software application with a replacement copy to maintain the desired deployment configuration. Although the replacement may provide the same functionality as the unavailable copy of the software application, the replacement copy might be executed on a different worker node, in a different pod, and/or in a different container, resulting in the replacement copy having different identifying information associated therewith (e.g., different IP address, different TCP or UDP ports, different name, etc.).

Proxies 416A and 416B may hide these changes behind a common virtual IP address and/or TCP and UDP port space so that remote user(s) 402 are unware of any modifications to the configuration.

Advantageously, this architecture provides a mechanism for scaling up or down applications over an arbitrary number of available computing resources (which may be centralized or distributed) with automated and application-independent redundancy, high availability, and load balancing. But further improvements are possible.

II. Decomposed Application Architecture

Figure 5:
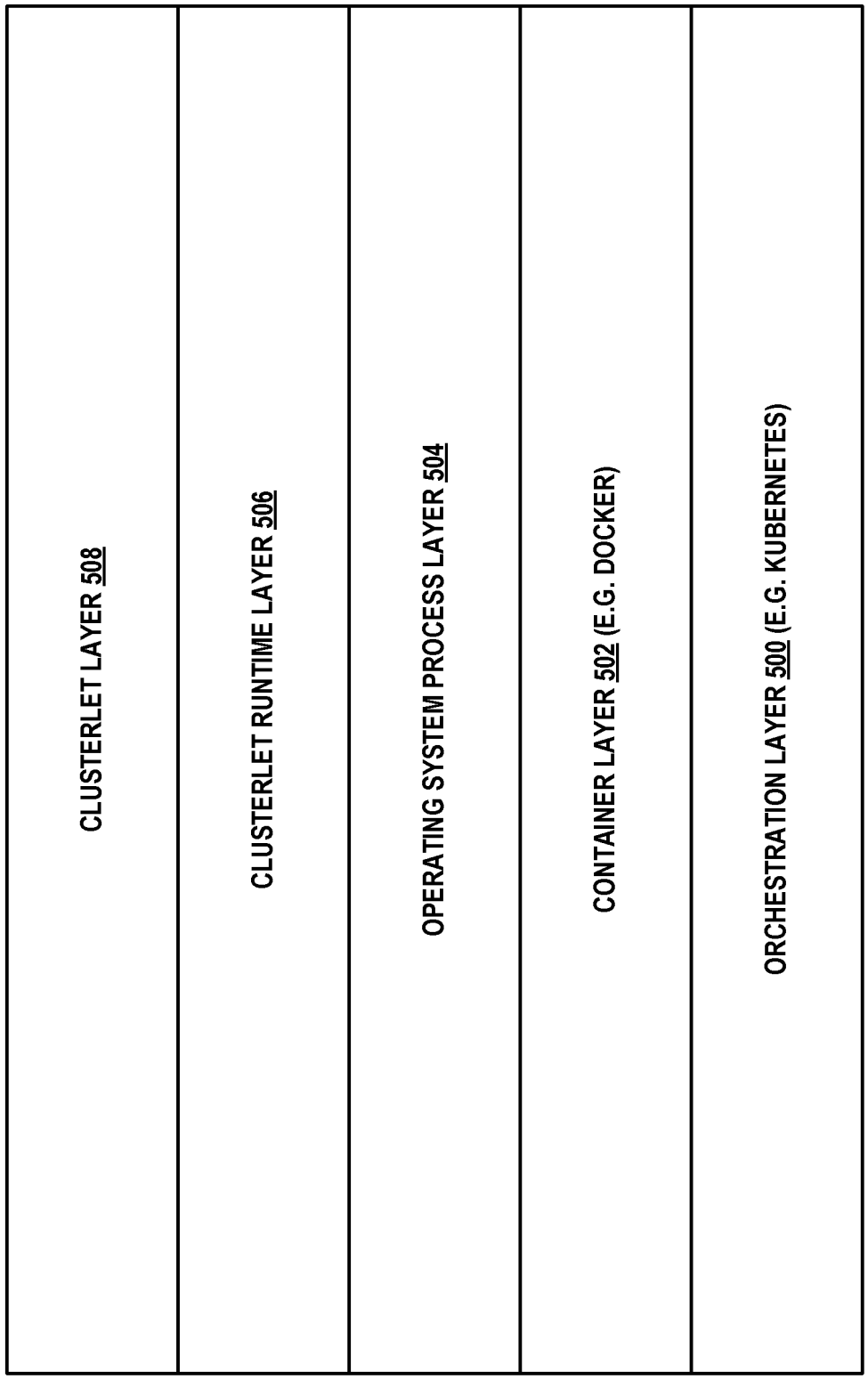
FIG. 5 illustrates a software stack that supports execution of decomposed applications, in accordance with example embodiments.

FIG. 5 depicts a logical representation of a software stack that supports execution of decomposed applications. The lowest layer is orchestration layer 500, which executes on the operating systems of one or more computing resources. Orchestration layer 500 may be, for example, KUBERNETES®, and may manage the deployment of pods and/or containers amongst these computing resources.

Container layer 502 is the runtime for a containerization system. Thus, container layer 502 may be the DOCKER® runtime, for instance, and may also execute on the operating systems of one or more computing resources.

Containerized applications deployed within container layer 502 may use operating system process layer 504 for execution. A process, as defined herein, is an instance of a computer program being executed. For instance, a process may contain an executable image of the program, as well as data in the form of a stack, a heap, system resources used (e.g., file handles and/or sockets), and processor context. A single program may consist of more than one process, and multiple instances of such a program may be executed by one or more sets of such processes.

As noted above, the embodiments herein provide support for decomposing systems and applications into state and a number of discrete executable units of logic each defined to carry out specific tasks on demand. These executable units may be referred to as "clusterlets." Clusterlet runtime layer 506 provides for execution and lifecycle management of such clusterlets. Thus, clusterlet runtime layer 506 can determine when to invoke and destroy clusterlets on demand (e.g., based on the occurrence of certain events).

Clusterlet layer 508 represents the clusterlets than make up a decomposed system or application. In some embodiments, clusterlets may be implemented using operating system threads. In general, an operating system process may consist of one or more individually executable threads, and each of these threads may share the same address space. Thus, threads can read from and write to the same data structures stored in the heap (e.g., the application state) and also share access to other system resources. This makes threads much more lightweight than processes, which facilitates faster invocation and destruction of threads, as well as communication therebetween. Nonetheless, the nuances of thread execution and capabilities may vary to some extent between operating systems.

Each clusterlet may be logic that is dynamically executed using a single thread or one or more threads. Thus, a decomposed system or application consists of one or more clusterlets along with state. Clusterlets may be compiled in a just-in-time fashion, and clusterlet runtime 506 may assemble and link the necessary clusterlet program code and enable execution thereof. Clusterlet runtime 506 only loads clusterlet program code in specific processes in which a clusterlet is active, and also keeps track of executing clusterlet code across the platform.

The threads may be pre-allocated into a thread pool and selected from this pool to execute clusterlets on demand. Therefore, a system or application includes a set of clusterlets and the operating system provides a set of threads, the latter managed by clusterlet runtime layer 506. When there is an event directed to a clusterlet, a thread is assigned to execute the logic of the clusterlet. After this event is processing is done, the thread is disassociated from the clusterlet and returned to the pool.

In some cases, there may be dependencies between clusterlets. For example, a first clusterlet may depend upon operations that are carried out by a second clusterlet. Clusterlet runtime 506 may maintain and enforce such dependencies, as well as any other relationships between clusterlets.

Clusterlet runtime layer 506 also provides messaging services between executing clusterlets, timers, and an interface into any stored state that is shared across clusterlets. The messaging capabilities allow clusterlets within the same process, the same container, the same physical or virtual machine, or across these entities to communicate reliably. The addressing of clusterlets to support this communication may be a system-specific or global namespace based on named data networking principles (e.g., each clusterlet may be addressable by a unique uniform resource locator). Part of this communication framework may include a discovery mechanism through which clusterlets can be registered and then discovered by other clusterlets. The messaging framework may also facilitate monitoring, security, and access control.

Clusterlet runtime 506 also keeps clusterlets operational in the case of hardware or operating system failure. For instance, clusterlet runtime 506 may move execution of a clusterlet from one virtual machine to another virtual machine. In particular, clusterlets may be implemented as position-independent program code, which means that this program code and any associated data can be moved across processes and containers. As clusterlet runtime 506 tracks the locations of all clusterlets, events and messages can be delivered to the right clusterlet no matter where it is stored or executed.

For purposes of redundancy, clusterlet runtime 506 may maintain replicas for one or more clusterlets so that the overall system is fault tolerant in case of a hardware or software failure. Each type of clusterlet can be associated with a distinct level of replication so that high availability is tunable per clusterlet type.

For example, high availability can be implemented for clusterlets as follows. Each clusterlet is associated with a replication factor that denotes the number of times that the program instructions and state of the clusterlet is replicated on the platform. Each type of clusterlet may have its own replication factor—this also allows each clusterlet type to have its own failure mode. The clusterlet runtime ensures that the replicas of a clusterlet are placed throughout memory so that any single fault or failure does not cause the clusterlet to become unreliable. When a clusterlet fails, one or its replicas can be triggered to take over its workload.

Clusterlet runtime 506 also maintains versioning information for clusterlets. This allows the system to upgraded or downgraded in a graceful and self-consistent fashion. Before upgrading or downgrading a clusterlet to a new version, clusterlet runtime 506 examines the state information associated with the new version and the state information associated with the old version of the clusterlet. If the new version's state is a superset of the old version's state, an upgrade from the old version to the new version or a downgrade from the new version to the old version is allowed. If the new version's state is a subset of the old version's state, clusterlet runtime 506 flags a warning and allows the operator to make the decision of whether to proceed with the upgrade or downgrade.

Some embodiments may include the following types of clusterlets: (1) controller clusterlets that manage other clusterlets, (2) worker clusterlets that carry out tasks, (3) distributor clusterlets that route messages to other clusterlets, and (4) delegate clusterlets that interface with external nodes and applications. In some cases, the functionality of delegate and distributor clusterlets may be combined.

Figure 6:
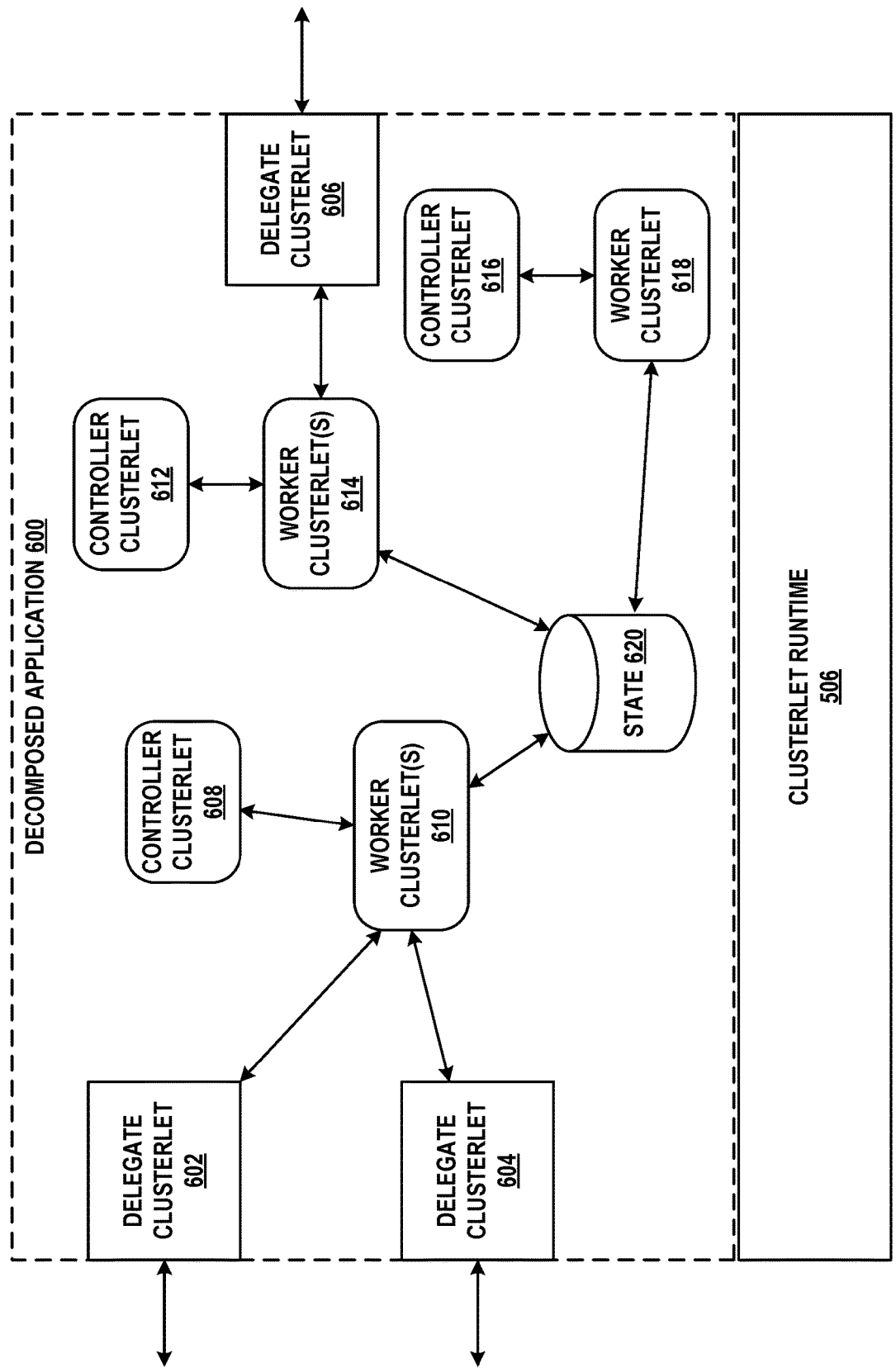
FIG. 6 illustrates a decomposed application, in accordance with example embodiments.

FIG. 6 depicts an example decomposed application 600. This decomposed application executes on clusterlet runtime 506 and defines four types of elements: controller clusterlets, worker clusterlets, delegate clusterlets, and application state. For sake of simplicity, distributor clusterlets are omitted. In some embodiments, other elements may be present. Although FIG. 6 is intended to represent a single application decomposed into multiple clusterlets, one or more processing nodes of a system could be represented in this fashion as well.

Application state 620 represents common information that is stored by the decomposed application, but is accessible to one or more of its clusterlets. This state may be configuration information, runtime state, error information, logs, and so on. In some embodiments, each clusterlet may maintain its own state in addition to or instead of application state 620.

Delegate clusterlets 602, 604, and 606 are configured to communicate with other programs or devices according to an interface definition. The interface definition may be that of an industry standard or proprietary interface, and may specify call flows and message content. Call flows may be sequences of messages that make up a transaction supported by the interface, while message contents may represent the internal arrangement of such messages in terms of fields, bytes, and/or bits. Although delegate clusterlets 602, 604, and 606 are not shown accessing application state 620 directly in FIG. 6, such operations are possible.

Delegate clusterlets 602, 604, and 606 may be configured to generate or provide the content of incoming messages, and invoke one or more other clusterlets to handle the further processing of such incoming data. Conversely, delegate clusterlets 602, 604, and 606 may also be configured to receive outgoing data from one or more other clusterlets, where this data is arranged in accordance with the relevant interface definition.

Controller clusterlets 608, 612, and 616 are defined to control and manage a specific type of worker clusterlet. As shown in FIG. 6, controller clusterlet 608 controls worker clusterlet(s) 610, controller clusterlet 612 controls worker clusterlet(s) 614, and controller clusterlet 616 controls worker clusterlet(s) 618.

Worker clusterlet(s) 610, 614, and 618 are defined to carry out discrete and limited functionality. A goal of the decomposed architecture herein is to configure worker clusterlets to be lightweight and simple, thus enabling rapid development, as well as rapid execution, thereof.

For example, worker clusterlet 608 may be defined to receive data from delegate clusterlets 602 and 604, store some or all of this data in application state 618, then trigger worker clusterlet 614 to read and further process the stored data. Worker clusterlet 614 may do so, arrange a representation of the processed data into a message compliant with the interface handled by delegate clusterlet 606, and provide this message to delegate clusterlet 606. Worker clusterlet 618 may operate independently of the other clusterlets. For example, worker clusterlet 618 may be invoked based on a timer (e.g., once per hour) to remove stale or unused data from application state 620.

For sake of simplicity, FIG. 6 does not show a master controller clusterlet, which may be present to control delegate clusterlets 602, 604, and 606, as well as controller clusterlets 608, 612, and 616.

III. Example System and Nodes Specified with a Blueprint

Figure 7:
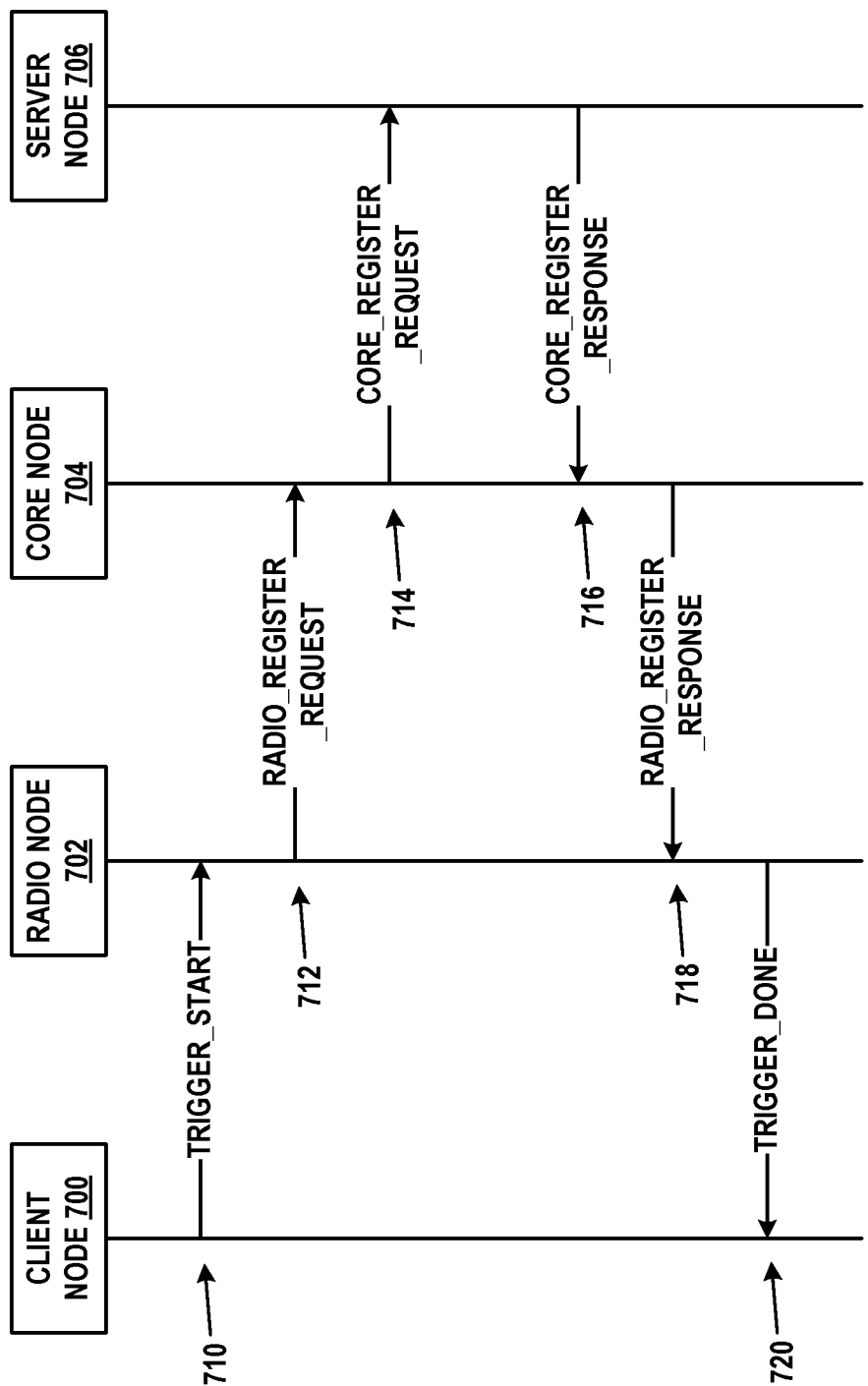
FIG. 7 depicts a call flow, in accordance with example embodiments.

FIG. 7 depicts a representation of a system and the nodes therein. The example will be used below to describe, by way of example, operation of the platform and blueprint-based specifications described herein. Nonetheless, the embodiments herein enable functionality and features that go beyond any one example. Further, ability to decompose nodes and applications into blueprints and clusterlets need not require an entire system to be defined.

The system contains four nodes—client node 700, radio node 702, core node 704, and server node 706. These nodes model parts of a 4G or 5G wireless network, for example. In particular, FIG. 7 depicts a call flow that allows client node to register with server node 706 by way of radio node 702 and core node 704. Nodes discussed in the context of FIG. 7 and the following figures are different from the nodes discussed in the context of FIG. 4. Therefore, processing nodes defined in a blueprint should not be confused with KUBERNETES® nodes, for example.

At step 710, client node 700 transmits a trigger_start message to radio node 702. At step 712, radio node 702 transmits a RADIO_register_request to core node 704 on behalf of client node 700. At step 714, core node 704 transmits a CORE_register_request to server node 706. Server node 706 may either indicate that the registration is a success or a failure. At step 716, server node 706 may do so by transmitting a CORE_register_response to core node 704. At step 718, core node 704 may transmit a RADIO_register_response to radio node 702. At step 720, radio node 702 may transmit a trigger_done message to client node 700.

Although omitted for purposes of maintaining the simplicity of FIG. 7, this system assumes that there will be one radio node worker clusterlet and one core node worker clusterlet per active user, but only one server node clusterlet that is shared by all active users. This will be made apparent in discussion of the example blueprint below.

To that point, FIGS. 8A, 8C, 8D, and 8E show an example blueprint that defines seven clusterlets, the call flows between these clusterlets, the formats of messages carrying content thereof, and processing logic to be carried out on server node 706. These clusterlets, the call flows, the formats, and the processing logic are an implementation of the transaction shown in FIG. 7. The blueprint specified in these figures may exist in a single blueprint definition file or may span multiple files.

FIG. 8A depicts seven clusterlet definitions. Each clusterlet definition has two or three parameters, including (in order) the name of the clusterlet, the type of the clusterlet, and the name of the clusterlet's parent clusterlet, if applicable. In this embodiment, each worker clusterlet has a controller clusterlet, and one controller clusterlet may control multiple worker clusterlets. There is a delegate clusterlet in this example (source node 700), that is not represented in FIG. 8A, but will be discussed in the context of FIG. 8C. Distributor clusterlets are not used in the example.

Clusterlet definition 800 specifies a controller clusterlet (as given in the "type=>:controller" parameter) that is named "controller" (as given in the "controller" parameter). This clusterlet definition has no parent, so it does not have a third parameter. The role of this clusterlet as defined is to control the operations of other controller clusterlets. For instance, a clusterlet using clusterlet definition 800 may initiate and then monitor the execution of clusterlets defined by clusterlet definitions 802, 806, and 810.

Clusterlet definition 802 specifies another controller clusterlet that is named "CORE_controller" (as given in the "CORE_controller" parameter). Its parent clusterlet definition is "controller"—defined by clusterlet definition 800 (as given in the "parent=>:controller" parameter). A clusterlet using clusterlet definition 802 controls worker clusterlets that make up the functions of the core node (i.e., as defined by clusterlet definition 804). Clusterlet definition 802 also specifies two sections, one for configuration data and one for context data. The configuration section is denoted by the "config" parameter, and its description is given by the "desc=>"Configuration Data" parameter. Similarly, the context section is denoted by the "context" parameter, and its description is given by the "desc=>"Context Data" parameter. Both these sections are empty for this clusterlet definition, but will be used in other clusterlet definitions.

Clusterlet definition 804 specifies worker clusterlets that are named "CORE" (as given in the "CORE" parameter). Its parent clusterlet definition is "CORE_controller"—clusterlet definition 802 (as given in the "parent=>:CORE_controller" parameter). The parameter "collection=>true" indicates that clusterlet definition 804 defines worker clusterlets and that there may be multiple copies of these clusterlets invoked and/or executing simultaneously. Clusterlets using clusterlet definition 804 carry out the functions of the core node. Notably, the context section of clusterlet definition 804 specifies a field named "serverName" of a type "OCTETSTRING" (e.g., a string of bytes), This field has a value of the ASCII characters "Server Identifier" as given by its third parameter. The use of this field will be described below.

Clusterlet definition 806 specifies another controller clusterlet that is named "RADIO_controller" (as given in the "RADIO_controller" parameter). Its parent clusterlet is "controller" as defined by clusterlet definition 800 (and as given in the "parent=>:controller" parameter). A clusterlet using clusterlet definition 806 controls clusterlets that make up the functions of the radio node. The configuration and context sections of clusterlet definition 806 are empty.

Clusterlet definition 808 specifies a worker clusterlet that is named "RADIO" (as given in the "RADIO" parameter). Its parent clusterlet is "RADIO_controller" as defined by clusterlet definition 806 (and as given in the "parent=>: RADIO_controller" parameter). The parameter "collection=>true" indicates that clusterlets using clusterlet definition 808 are worker clusterlets and that there may be multiple copies of these clusterlets invoked and/or executing simultaneously. Clusterlets using clusterlet definition 808 carry out the functions of the radio node. The configuration and context sections of clusterlet definition 806 are empty.

Clusterlet definition 810 specifies another controller clusterlet that is named "SERVER_controller" (as given in the "SERVER_controller" parameter). Its parent clusterlet is "controller" as defined by clusterlet definition 800 (and as given in the "parent=>:controller" parameter). A clusterlet using clusterlet definition 810 controls clusterlets that make up the functions of the server node. The configuration and context sections of definition 810 are empty.

Clusterlet definition 812 specifies a worker clusterlet, and is named "SERVER" (as given in the "SERVER" parameter). Its parent clusterlet is "SERVER_controller" as defined by clusterlet definition 810 (as given in the "parent=>: SERVER_controller" parameter). Clusterlets using clusterlet definition 812 carry out the functions of the server node. The configuration section of clusterlet definition 812 specifies a field named "myname" of a type "OCTETSTRING". This field has a value of the ASCII characters "Server Identifier" as given by its third parameter. In this fashion, clusterlet definition 804 is able to refer to clusterlet definition 812 and the effect of doing so is to have all "CORE" worker clusterlets defined by clusterlet definition 804 use the same "SERVER" worker clusterlet. Further, the context section defines three fields: an unsigned 32-bit integer named "count", a Boolean named "successFlag", and another Boolean named "failureFlag". These three fields represent local variables used by the clusterlets using clusterlet definition 812.

Figure 8B:
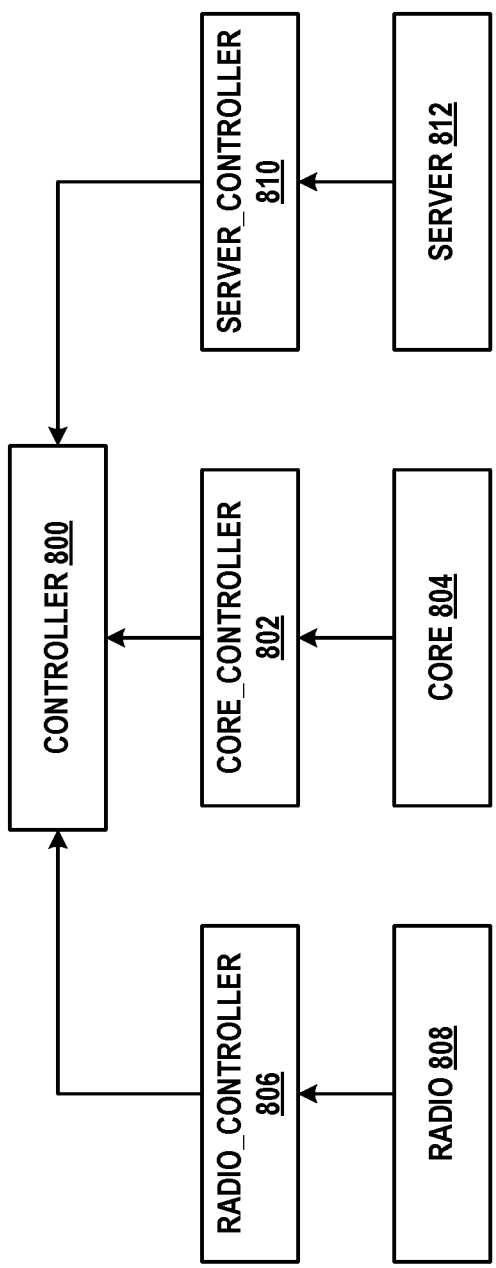
FIG. 8B depicts a clusterlet arrangement based on the blueprint of FIG. 8A, in accordance with example embodiments.

FIG. 8B depicts relationships between the clusterlet definitions of FIG. 8A. Notably, clusterlets definitions 802, 806, and 810 are children of clusterlet definition 800, while clusterlet definition 808 is a child of clusterlet definition 806, clusterlet definition 804 is a child of clusterlet definition 802, and clusterlet definition 812 is a child of clusterlet definition 810. Radio node worker clusterlets defined by clusterlet definition 808 take on the functionality of radio node 702, core node worker clusterlets defined by clusterlet definition 804 take on the functionality of core node 704, and server node worker clusterlets defined by clusterlet definition 812 take on the functionality of server node 706.

In a system defined in this fashion, the controller defined by clusterlet definition 800 is initiated first, and initiates the other controllers (those defined by clusterlet definitions 802, 806, and 810). Then those controllers are responsible for initiating their children. Each of these controllers has a management role, as it will periodically or from time to time check its children for liveness and proper operation.

FIG. 8C depicts definitions and an invocation of a call flow between the clusterlets defined in FIG. 8A. This call flow matches the one depicted in FIG. 7. The text shown in FIG. 8C may appear in the same blueprint file as that of FIG. 8A, or in a different blueprint file.

Call flow invocation 820 causes the call flow named "Registration Procedure" (as given in its first parameter) to be carried out. Call flow invocation 820 also defines the type of this call flow to be "Registration_Procedure" (as given in its second parameter).

Call flow definition 822 specifies the "Registration_Procedure" call flow (thus, call flow invocation 820 causes a call flow in accordance with call flow definition 822 to be performed). Call flow definition 822 consists of five calls to the platform-supported (i.e., built in) function sendmsg( ), as well as the invocation of another call flow. Each of these relate to one of the messages in FIG. 7. The four main parameters of sendmsg( ) is the name of the message, the type of the message, the source of the message, and the destination of the message. A fifth optional parameter indicates whether an action is to be taken by the receiving clusterlet in response to receiving the message.

For example, the first sendmsg( ) call is named "trigger_start" and is of the type "RegisterRequest". The source is an external node named "test" and the destination is a RADIO clusterlet (e.g., a clusterlet defined by clusterlet definition 808). The external node refers to client node 700 of FIG. 7. In these embodiments, an external node refers to a node that is not explicitly defined in the blueprint, and instead is represented as a delegate clusterlet. Thus, the first sendmsg( ) call defines the trigger start message of step 710, and then causes a delegate clusterlet to be created and to transmit this message to a RADIO clusterlet.

In another example, the second sendmsg( ) call is named "RADIO_Register_Request" and is of the type "RegisterRequest". The source is a RADIO clusterlet (e.g., a clusterlet defined by clusterlet definition 808) and the destination is a CORE clusterlet (e.g., a clusterlet defined by clusterlet definition 804). Thus, the second sendmsg( ) call defines the RADIO_Register_Request message of step 712, and causes a RADIO clusterlet to transmit this message to a CORE clusterlet.

In a similar fashion, the third sendmsg( ) call defines the CORE Register Request message of step 714, and causes a CORE clusterlet to transmit this message to the SERVER clusterlet (recall that this blueprint indicates that all CORE clusterlets communicate with the same SERVER clusterlet). Likewise, the fourth sendmsg( ) call defines the RADIO_Register_Response message of step 718, and causes a CORE clusterlet to transmit this message to a RADIO clusterlet. Also, the fifth sendmsg( ) call defines the trigger_done message of step 720, and causes a RADIO clusterlet to transmit this message to a delegate clusterlet that represents client node 700.

Step 716 is not defined in a single sendmsg( ) call, and instead is defined in call flow definition 824. In this manner, complex messages and/or messages with complex associated operations can be broken down into discrete logical components that are easier to represent in a blueprint. In short, call flow definition 824 carries out part of the server registration procedure, and specifies two possible outcomes of this procedure. Only one of these outcomes will be chosen for any particular transaction.

The first outcome 824A is a successful registration, as indicated by the sendmsg( ) call therein. This sendmsg( ) call is named "CORE_Register_Response_Success", is of type "RegisterResponse", is transmitted by the SERVER clusterlet to a CORE clusterlet, and is triggered by the condition that the variable "successFlag" (defined in clusterlet definition 812) is true. As indicated in the fields of this message, the SERVER clusterlet transmits the message to a CORE clusterlet with a status code of 0. This message corresponds to step 716 of FIG. 7.

The second outcome 824B is an unsuccessful registration, as indicated by the sendmsg( ) call therein. This sendmsg( ) call is named "CORE_Register_Response_Fail", is of type "RegisterResponse", is transmitted by the SERVER clusterlet to a CORE clusterlet, and is triggered by the condition that the variable "failureFlag" (defined in clusterlet definition 812) is true. As indicated in the fields of this message, the SERVER clusterlet transmits the message to a CORE clusterlet with a status code of 100 and a description of "Authentication Error". This message also corresponds to step 716 of FIG. 7.

The content of the "RegisterRequest" and "RegisterResponse" message types are depicted in FIG. 8D. The text shown in FIG. 8D may appear in the same blueprint file as that of FIG. 8A and/or 8C, or in a different blueprint file.

Message definition 830 defines format of the "RegisterRequest" message that appears in steps 712 and 714. For purposes of this example, the format is minimal, with "keyValue" and "serverName" fields defined. These fields are used just for purposes of illustrating how such fields can be defined.

Message definitions 832 and 834 jointly define the format of the "RegisterResponse" message that appears in steps 716 and 718. Message definition 832 specifies that the "RegisterResponse" message contains two fields, "keyValue" and "status". The content of the "status" field is defined in message definition 834 as the type "StatusObject". As depicted, the "status" field contains two sub-fields, "statusCode" and "statusDescription". The former is an unsigned 32-bit integer that can take on values of 0, 100-105, or 200. Such "statusCode" fields are used in outcomes 824A and 824B. The latter is an optional field that provides a byte string containing a description of the "statusCode". A "statusDescription" field is used in outcome 824B.

FIG. 8E depicts processing carried out by nodes in response to receiving particular messages. Function 840 defines processing to be carried out by a node that receives a "RADIO_Register_Request" message. In this example, that is a CORE node. In particular, this function assigns to the serverName field of the CORE node (as shown in clusterlet definition 804) the value of the serverName field received in such a message (as shown in message definition 830). Function 840 is invoked due to the "onrecv=true" parameter to the second sendmsg( ) call of call flow definition 822.

Function 842 defines processing to be carried out by a node that receives a "CORE_Register_Request" message. In this example, that is the SERVER node. In particular, the SERVER node's count variable (defined in clusterlet definition 812) is tested to determine whether its value is less than 2. If so, the registration is considered successful, the values of "successFlag" and "failureFlag" are set appropriately, and the count variable is incremented. Otherwise, the registration is considered unsuccessful, the values of "successFlag" and "failureFlag" are set appropriately, and the count variable is set to zero. Function 842 is invoked due to the "onrecv=true" parameter to the third sendmsg( ) call of call flow definition 822.

Once defined in one or more blueprints, a system or application can be created by compiling the blueprint file(s) into machine executable code. The machine executable code may be deployed, with one or more clusterlet runtimes, to one or more physical or virtual machines.

IV. Example Graphical User Interfaces

Figure 9A:
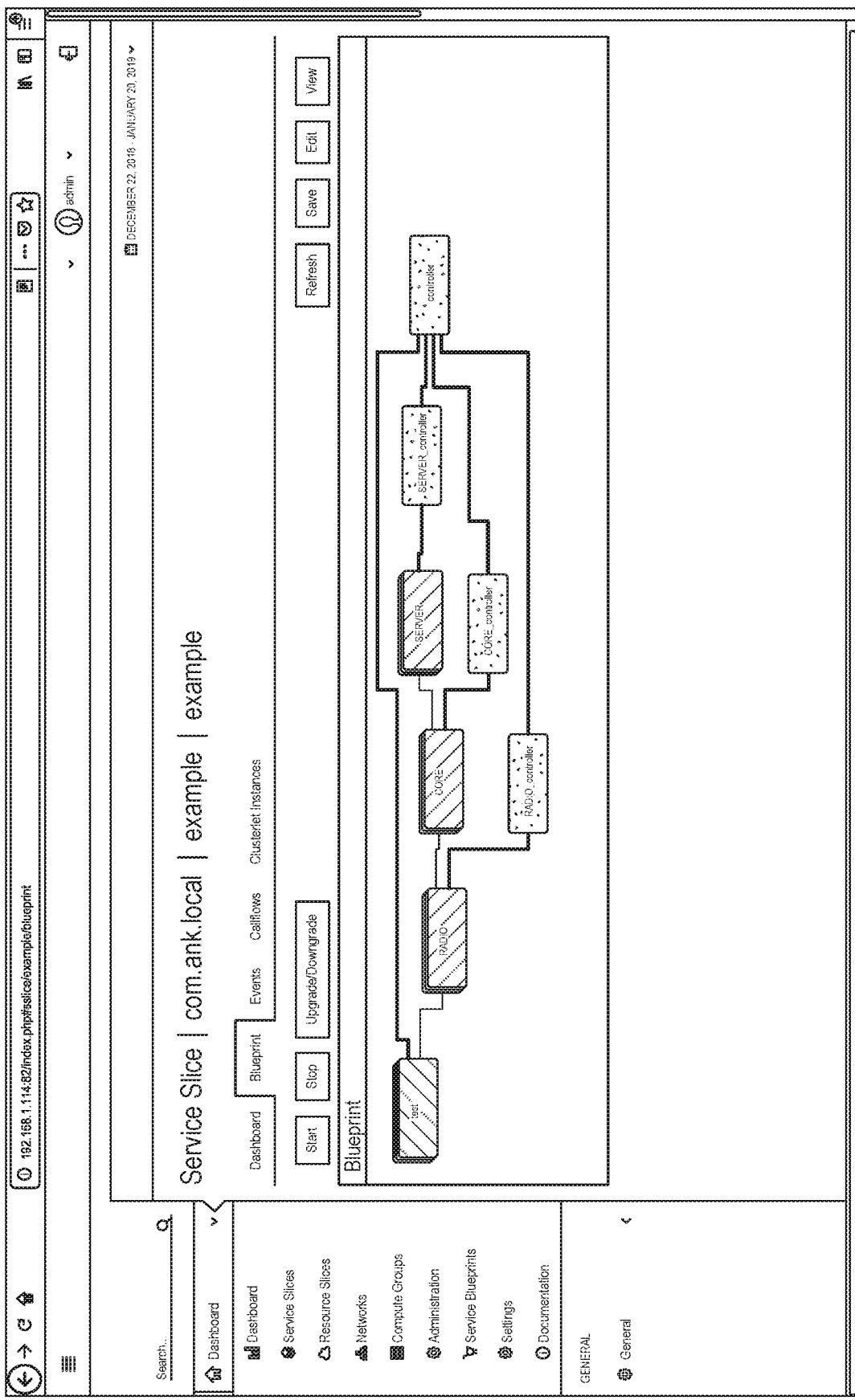
FIG. 9A depicts a graphical user interface (GUI), in accordance with example embodiments.
Figure 9B:
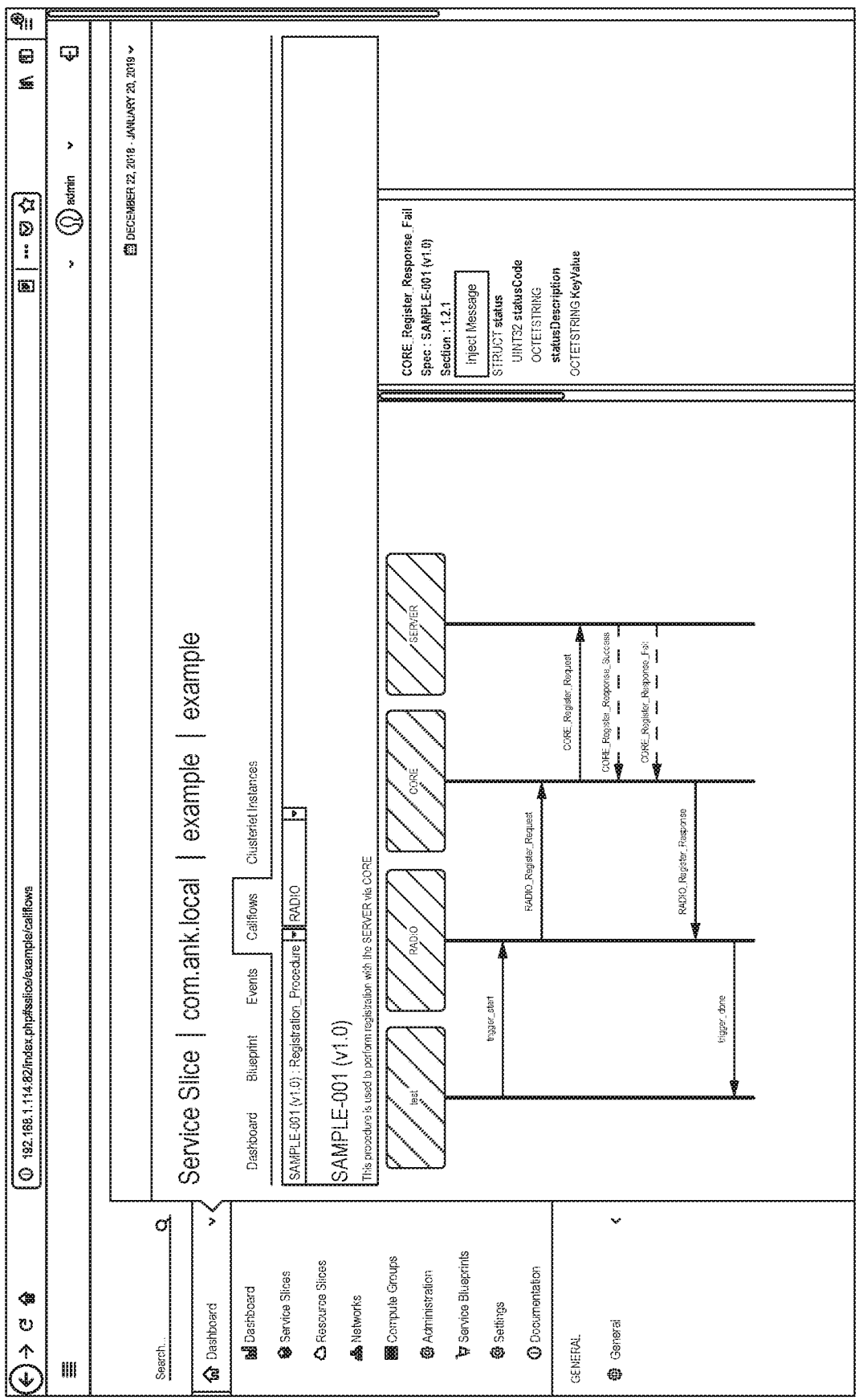
FIG. 9B depicts another GUI, in accordance with example embodiments.
Figure 9C:
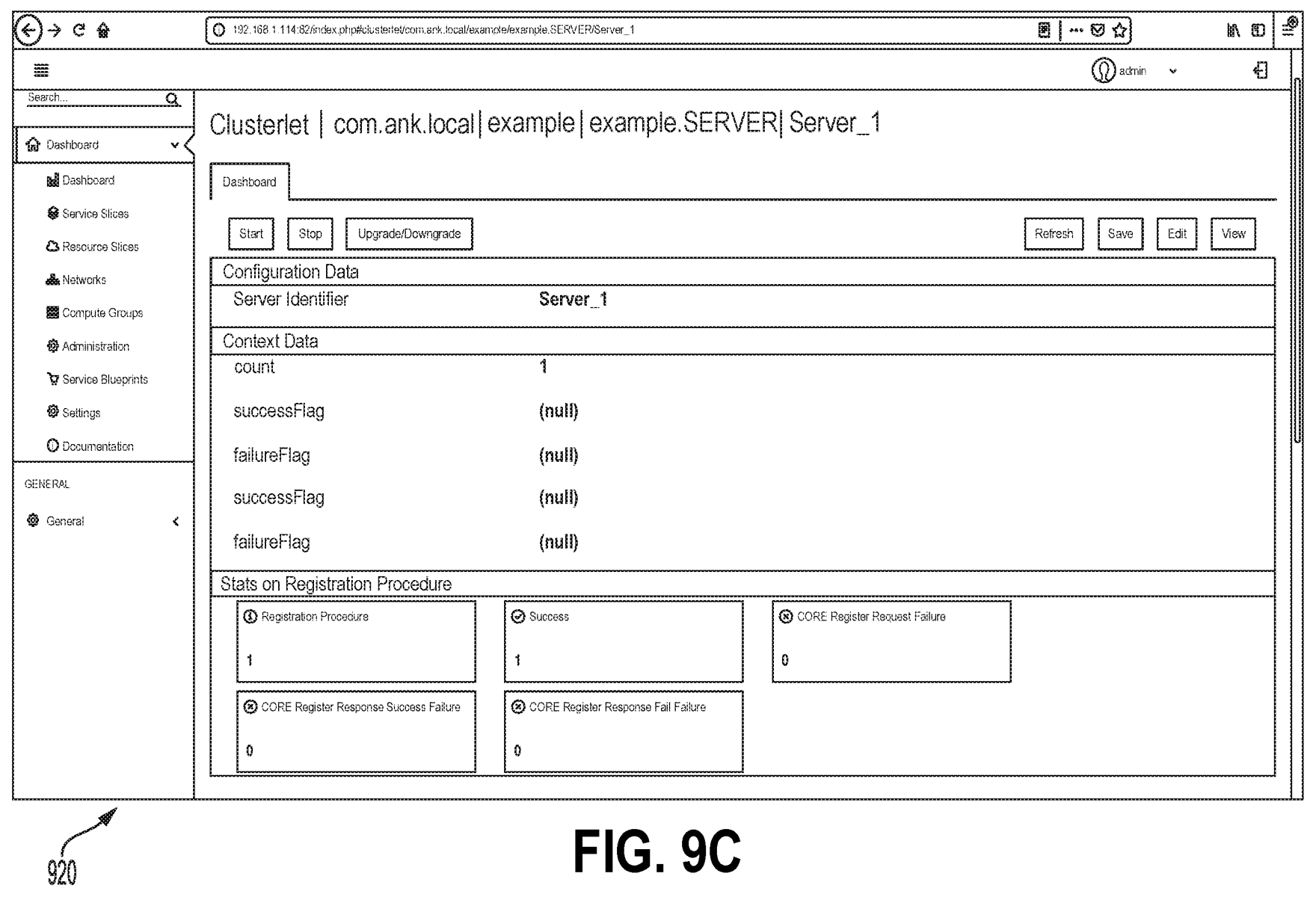

FIGS. 9A, 9B, and 9C provide example GUIs that can be generated and displayed based on one or more blueprint files. One of the advantages of such GUIs is that they allow the designer of blueprints to visualize the system and/or application arrangement represented by the blueprint, as well as the relationships and communications between the nodes or modules therein. The example GUIs of FIG. 9A, 9B, and 9C were generated based on the blueprint file(s) of FIGS. 8A, 8C, 8D, and 8E.

FIG. 9A depicts a GUI 900 that displays clusterlets defined the blueprint of FIG. 8A, as well as architectural and communicative relationships between these clusterlets. As such, the boxes representing the controller clusterlets ("controller", "RADIO_controller", "CORE_controller", and "SERVER_controller") may appear visually different (e.g., in a different color or shading) from the boxes representing the worker clusterlets ("RADIO", "CORE", and "SERVER"). The test" delegate clusterlet is also represented, again possibly appearing visually different from the boxes representing the controller clusterlets and the worker clusterlets. The presence of the "test" delegate clusterlet may be determined based on the blueprint in FIG. 8C, for example.

Further, the thick lines between the boxes representing "controller" and "test" as well as "controller" and each of the other controller clusterlets may represent the control relationship between these clusterlets. Similarly, the thin lines between "test" and "RADIO", "RADIO" and "CORE", and "CORE" and "SERVER" may represent the communicative relationships between these clusterlets. These communicative relationships may be determined based on the blueprint in FIG. 8C, for example.

FIG. 9B depicts a GUI 910 that displays worker and delegate clusterlets defined the blueprints of FIGS. 8A and 8C, as well as communicative relationships between these clusterlets. In particular, GUI 910 illustrates the call flow defined in FIG. 8C, including the messages exchanged between various pairs of worker clusterlets, where the worker clusterlets represent processing nodes. Notably, GUI 910 depicts the two possible responses to the CORE_Register_Request message with dashed lines to indicate that either one or the other will be transmitted.

Similarly, to GUI 910, additional GUIs can be used to simulate or test the defined call flow. These GUIs may represent the nodes and messages in a similar fashion, but only show the messages actually generated and transmitted.

FIG. 9C depicts a GUI 920 that displays information regarding a single clusterlet. In particular, GUI 920 displays information regarding a clusterlet representing a "SERVER" node.

The displayed information includes the configuration data (e.g., as defined in the clusterlet definitions of FIG. 8A), the context data (e.g., also as defined in the clusterlets of FIG. 8A), and statistics. The configuration and context data may be displayed at any time, but statistics would typically be displayed when the system is in operation (otherwise, most or all statistics may have a value of zero). For example, the configuration data of GUI 920 indicates that the clusterlet is named "Server_1", the context data indicates that there is one active registration with this clusterlet, and the statistics indicate that there has been one registration procedure, one success, and no failures.

FIGS. 9A, 9B, and 9C provide just a few example GUIs. The blueprint files of FIGS. 8A, 8C, 8D, and 8E could be used to generate various other GUIs as well. Further, these GUIs may be displayed on the same computing device that compiles the blueprint(s), or may be provided (e.g., by way of a web interface) to another computing device.

V. Example Operations

Figure 10:
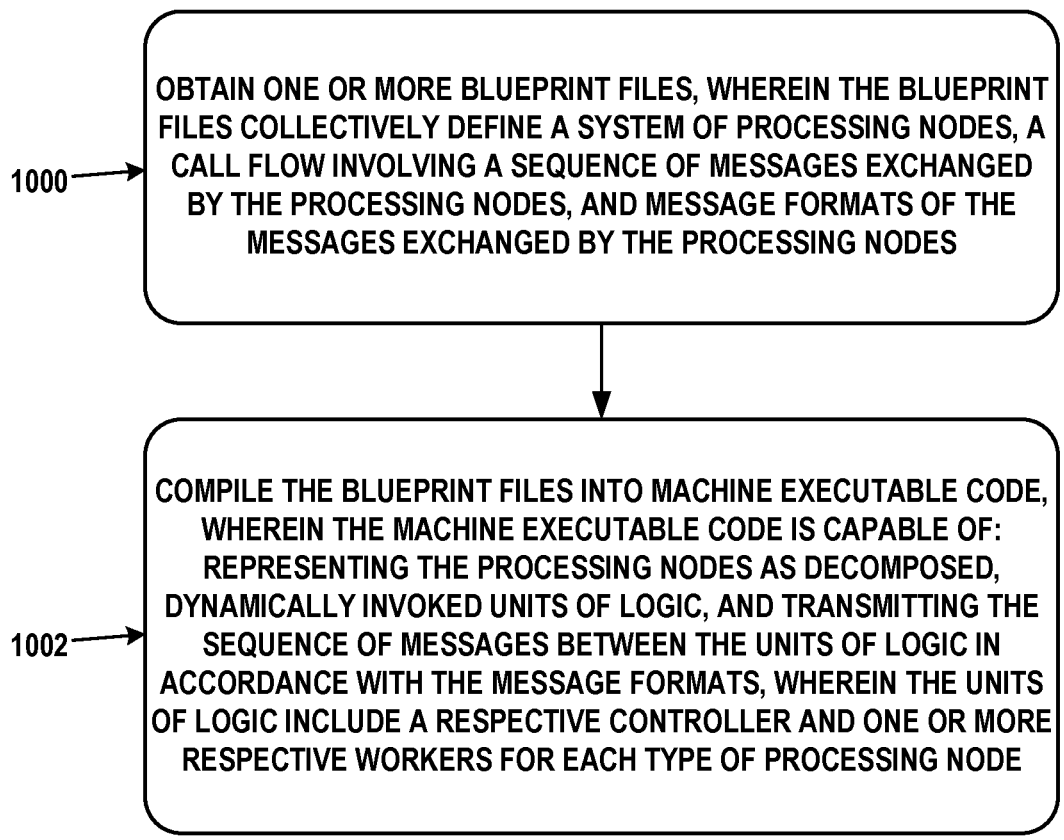
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. Aspects of the process may be carried out by a clusterlet runtime layer operating on such a computing device or cluster of computing devices. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve obtaining one or more blueprint files, wherein the blueprint files collectively define a system of processing nodes, a call flow involving a sequence of messages exchanged by the processing nodes, and message formats of the messages exchanged by the processing nodes.

Block 1002 may involve compiling the blueprint files into machine executable code, wherein the machine executable code is capable of: representing the processing nodes as decomposed, dynamically invoked units of logic, and transmitting the sequence of messages between the units of logic in accordance with the message formats, wherein the units of logic include a respective controller and one or more respective workers for each type of processing node.

In some embodiments, the blueprint files also define further units of logic executed by one or more of the processing nodes, wherein each of the further units of logic is invoked in response to one or more of the processing nodes transmitting or receiving one of the messages.

In some embodiments, the blueprint files also refer to an external node that is not explicitly defined in the system of processing nodes, and wherein at least one of the messages is transmitted to or received from the external node.

In some embodiments, the processing nodes represent software applications, and wherein the units of logic represent discrete functions of the software applications.

Some embodiments may further involve executing, by a computing system separate from any computing device performing the operations of blocks 1000 and 1002, the machine executable code so that the processing nodes carry out operations defined in the call flow, wherein the computing system comprises platform services that execute the units of logic on demand to process the messages.

In some embodiments, the platform services maintain a pool of executable threads, wherein the platform services allocate threads from the pool on demand to carry out respective operations of the units of logic, and wherein the platform services deallocate the threads to the pool after completion of the respective operations.

In some embodiments, the platform services provide communication services that facilitate exchange of communications between the units of logic.

In some embodiments, the platform services provide versioning services that facilitate upgrades and downgrades of the units of logic, wherein a particular unit of logic from the units of logic has an old version and a new version, wherein an upgrade from the old version to the new version or a downgrade from the new version to the old version is allowed when state represented in the new version includes all state represented in the old version.

Some embodiments may further involve generating a GUI representing: (i) the respective controller and the one or more respective workers for each type of processing node as boxes, (ii) lines in a first format between each respective controller and its one or more respective workers, and (iii) lines in a second format between workers from different processing nodes that are defined by the call flow to communicate with one another. These embodiments may also involve providing, for display, the GUI.

Some embodiments may further involve generating a GUI representing: (i) each of the processing nodes as boxes, (ii) lines in a first format extending vertically from each of the boxes, and (iii) lines in a second format arranged perpendicularly to the lines in the first format and representing each of the messages in the call flow that are transmitted between respective pairs of the processing nodes. These embodiments may also involve providing, for display, the GUI.

Some embodiments may further involve generating a GUI representing, for a particular processing node of the processing nodes, configuration data, context data, and statistical data, wherein the configuration data includes an identifier of the particular processing node, wherein the context data includes variables and associated values maintained by the particular processing node, and wherein the statistical data maintains counts related to transactions involving the messages processed by the particular processing node. These embodiments may also involve providing, for display, the GUI.

VI. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long term storage, like ROM, optical or magnetic disks, solid state drives, compact-disc read only memory (CD-ROM), for example. The non-transitory computer readable media can also be any other volatile or non-volatile storage system. A non-transitory computer readable medium can be considered a non-transitory computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
obtaining, by a computing device, one or more blueprint files, wherein the blueprint files define: a system of processing nodes programmed to carry out specific tasks on demand, a call flow involving a sequence of messages exchanged by the processing nodes, and message formats of the messages; and
compiling, by the computing device, the blueprint files into machine executable code, wherein the machine executable code is configured to: represent the processing nodes as dynamically invoked units of logic and associated states that carry out the specific tasks, and transmit the sequence of messages between the units of logic in accordance with the message formats.

2. The method of claim 1, wherein the blueprint files also define further units of logic executed by one or more of the processing nodes, wherein each of the further units of logic is invoked in response to one or more of the processing nodes transmitting or receiving one of the messages.

3. The method of claim 1, wherein the blueprint files also refer to an external node that is not explicitly defined in the system of processing nodes, and wherein at least one of the messages is transmitted to or received from the external node.

4. The method of claim 1, wherein the processing nodes represent software applications, and wherein the units of logic represent discrete functions of the software applications.

5. The method of claim 1, further comprising:
executing, by a computing system separate from the computing device, the machine executable code so that the processing nodes carry out operations defined in the call flow, wherein the computing system comprises platform services that execute the units of logic on demand to process the messages.

6. The method of claim 5, wherein the platform services maintain a pool of executable threads, wherein the platform services allocate threads from the pool on demand to carry out respective operations of the units of logic, and wherein the platform services deallocate the threads to the pool after completion of the respective operations.

7. The method of claim 5, wherein the platform services provide communication services that facilitate exchange of communications between the units of logic.

8. The method of claim 5, wherein the platform services provide versioning services that facilitate upgrades and downgrades of the units of logic, wherein a particular unit of logic from the units of logic has an old version and a new version, wherein an upgrade from the old version to the new version or a downgrade from the new version to the old version is allowed when state represented in the new version includes all state represented in the old version.

9. The method of claim 1, wherein the units of logic include a respective controller and one or more respective workers for each type of processing node, the method further comprising:
   generating, by the computing device, a graphical user interface representing: the respective controller and the one or more respective workers for each type of processing node as boxes, lines in a first format between each respective controller and its one or more respective workers, and lines in a second format between workers from different processing nodes that are defined by the call flow to communicate with one another; and
   providing, for display, the graphical user interface.

10. The method of claim 1, further comprising:
    generating, by the computing device, a graphical user interface representing: each of the processing nodes as boxes, lines in a first format extending vertically from each of the boxes, and lines in a second format arranged perpendicularly to the lines in the first format and representing each of the messages in the call flow that are transmitted between respective pairs of the processing nodes; and
    providing, for display, the graphical user interface.

11. The method of claim 1, further comprising:
    generating, by the computing device, a graphical user interface representing, for a particular processing node of the processing nodes, configuration data, context data, and statistical data, wherein the configuration data includes an identifier of the particular processing node, wherein the context data includes variables and associated values maintained by the particular processing node, and wherein the statistical data maintains counts related to transactions involving the messages processed by the particular processing node; and
    providing, for display, the graphical user interface.

12. An article of manufacture including a non-transitory computer-readable medium, having stored thereon program instructions that, upon execution by a computing device, cause the computing device to perform operations comprising:
    obtaining one or more blueprint files, wherein the blueprint files define: a system of processing nodes programmed to carry out specific tasks on demand, a call flow involving a sequence of messages exchanged by the processing nodes, and message formats of the messages; and
    compiling the blueprint files into machine executable code, wherein the machine executable code is configured to: represent the processing nodes as dynamically invoked units of logic and associated states that carry out the specific tasks, and transmit the sequence of messages between the units of logic in accordance with the message formats.

13. The article of manufacture of claim 12, wherein the blueprint files also define further units of logic executed by one or more of the processing nodes, wherein each of the further units of logic is invoked in response to one or more of the processing nodes transmitting or receiving one of the messages.

14. The article of manufacture of claim 12, wherein the processing nodes represent software applications, and wherein the units of logic represent discrete functions of the software applications.

15. The article of manufacture of claim 12, the operations further comprising:
    executing, by a computing system separate from the computing device, the machine executable code so that the processing nodes carry out operations defined in the call flow, wherein the computing system comprises platform services that execute the units of logic on demand to process the messages.

16. The article of manufacture of claim 15, wherein the platform services maintain a pool of executable threads, wherein the platform services allocate threads from the pool on demand to carry out respective operations of the units of logic, and wherein the platform services deallocate the threads to the pool after completion of the respective operations.

17. A computing device comprising:
    one of more processors;
    memory; and
    program instructions, stored in the memory, that upon execution by the one or more processors cause the computing device to perform operations comprising:
       obtaining one or more blueprint files, wherein the blueprint files define: a system of processing nodes programmed to carry out specific tasks on demand, a call flow involving a sequence of messages exchanged by the processing nodes, and message formats of the messages; and
       compiling the blueprint files into machine executable code, wherein the machine executable code is configured to: represent the processing nodes as dynamically invoked units of logic and associated states that carry out the specific tasks, and transmit the sequence of messages between the units of logic in accordance with the message formats.

18. The computing device of claim 17, wherein the blueprint files also define further units of logic executed by one or more of the processing nodes, wherein each of the further units of logic is invoked in response to one or more of the processing nodes transmitting or receiving one of the messages.

19. The computing device of claim 17, wherein the processing nodes represent software applications, and wherein the units of logic represent discrete functions of the software applications.

20. The computing device of claim 17, the operations further comprising:
    executing, by a computing system separate from the computing device, the machine executable code so that the processing nodes carry out operations defined in the call flow, wherein the computing system comprises platform services that execute the units of logic on demand to process the messages.

* * * * *